(12) United States Patent
Yeomans et al.

(10) Patent No.: US 12,017,508 B2
(45) Date of Patent: Jun. 25, 2024

(54) CLIMATE CONTROL SYSTEM

(71) Applicant: Apple Inc., Cupertino, CA (US)

(72) Inventors: Paul D. Yeomans, Morgan Hill, CA (US); John M. Kearney, San Jose, CA (US); Justin T. Krull, San Jose, CA (US); Scott Wujek, San Jose, CA (US); Kegan J. Connick, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/868,233

(22) Filed: Jul. 19, 2022

(65) Prior Publication Data

US 2023/0061874 A1 Mar. 2, 2023

Related U.S. Application Data

(60) Provisional application No. 63/240,036, filed on Sep. 2, 2021.

(51) Int. Cl.
*B60H 1/00* (2006.01)
*B60H 1/24* (2006.01)
*B60H 3/06* (2006.01)

(52) U.S. Cl.
CPC ..... *B60H 1/00907* (2013.01); *B60H 1/00321* (2013.01); *B60H 1/00664* (2013.01); *B60H 1/008* (2013.01); *B60H 1/248* (2013.01); *B60H 3/0608* (2013.01); *B60H 2001/00942* (2013.01)

(58) Field of Classification Search
CPC ............ B60H 1/00907; B60H 1/00821; B60H 1/00935; B60H 1/00864; B60H 1/00321; B60H 1/00664; B60H 1/008; B60H 1/248; B60H 2001/00942; B60H 2001/00242
See application file for complete search history.

(56) References Cited

U.S. PATENT DOCUMENTS

| | | | |
|---|---|---|---|
| 5,259,813 A | 11/1993 | Abthoff et al. | |
| 5,669,813 A * | 9/1997 | Jairazbhoy | B60H 1/00271 361/645 |
| 6,800,022 B2 | 10/2004 | Urbank et al. | |
| 8,092,285 B2 | 1/2012 | Mathur et al. | |

(Continued)

FOREIGN PATENT DOCUMENTS

| | | |
|---|---|---|
| DE | 202005002221 U1 | 5/2005 |
| EP | 1236594 A2 | 9/2002 |

(Continued)

OTHER PUBLICATIONS

International Search Report and Written Opinion dated Nov. 8, 2022, in Intl. App. No. PCT/US2022/037584 (12 pp).

*Primary Examiner* — Marc E Norman
(74) *Attorney, Agent, or Firm* — Young Basile Hanlon & MacFarlane, P.C.

(57) ABSTRACT

A climate control system includes a front-end or first heat exchanger configured to thermally condition airflow from an environment external to a cabin, a rear-end or second heat exchanger configured to thermally condition airflow from the cabin, a recirculation path configured to return airflow from the second heat exchanger to the cabin, and an extraction path configured to vent airflow from the second heat exchanger to the environment external to the cabin. Various operational modes of the climate control system direct airflow to either the recirculation path or the extraction path.

20 Claims, 10 Drawing Sheets

(56) References Cited

U.S. PATENT DOCUMENTS

| | | |
|---|---|---|
| 9,682,610 B2 | 6/2017 | Duan et al. |
| 2006/0080986 A1* | 4/2006 | Inoue ................ B60H 1/00278 62/186 |
| 2009/0257190 A1* | 10/2009 | Yoda ...................... B60L 3/003 361/690 |
| 2011/0165830 A1* | 7/2011 | Smith ............... B60H 1/00278 454/75 |
| 2013/0207420 A1 | 8/2013 | Kumar et al. |
| 2016/0052363 A1 | 2/2016 | Ostermeier et al. |
| 2020/0164720 A1 | 5/2020 | Hotzel et al. |
| 2020/0313256 A1* | 10/2020 | Kuronuma .......... H01M 10/663 |
| 2021/0210811 A1* | 7/2021 | Uto ....................... B60K 11/06 |
| 2022/0348057 A1* | 11/2022 | Wujek ............... B60H 1/00207 |

FOREIGN PATENT DOCUMENTS

| | | |
|---|---|---|
| EP | 3312031 B1 | 1/2021 |
| JP | 2009023566 A | 2/2009 |
| JP | 2010116135 A | 5/2010 |
| WO | 2019054646 A1 | 3/2019 |

\* cited by examiner

CLIMATE CONTROL SYSTEM

CROSS-REFERENCE TO RELATED APPLICATION(S)

This application claims the benefit of U.S. Provisional Patent Application No. 63/240,036 filed on Sep. 2, 2021, the content of which is hereby incorporated by reference in its entirety for all purposes.

TECHNICAL FIELD

This disclosure relates generally to climate control systems and in particular to a climate control system with a variety of operational modes.

BACKGROUND

Duct routing, vent design, and air extraction or exhaust methods associated with traditional cabin configurations may not provide adequate climate control efficiency or occupant comfort in novel cabin configurations. Climate control can be more complicated to achieve in an electric or hybrid-electric configuration than with a combustion engine since excess, waste, or by-product heat available to the climate control system from the propulsion system is limited in comparison.

SUMMARY

A first aspect of the disclosed embodiments is a climate control system including a first heat exchanger configured to thermally condition airflow from an environment external to a vehicle cabin, a second heat exchanger configured to thermally condition airflow from the vehicle cabin, a recirculation path configured to return airflow from the second heat exchanger to the vehicle cabin, and an extraction path configured to vent airflow from the second heat exchanger to the environment external to the vehicle cabin.

In the first aspect, the climate control system may include a partition configured to block either the recirculation path or the extraction path based on an operational mode of the climate control system. The extraction path may be a first extraction path, and the climate control system may include a second extraction path separate and spaced from the first extraction path and configured to vent airflow from the vehicle cabin to the environment external to the vehicle cabin. The partition may be is a first partition, and the climate control system may include a second partition configured to selectively block the second extraction path. The climate control system may include a third heat exchanger configured to thermally condition airflow along the second extraction path. The third heat exchanger may be configured to operate in a heat pump operational mode and a cold pump operational mode. The second and third heat exchangers may selectively operate as one of evaporators, gas coolers, or condensers. The first and second heat exchangers may be configured to heat airflow in a heating operational mode and a heating with recapture operational mode, and the first and second heat exchangers may be configured to cool airflow in a cooling operational mode and a cooling with recapture operational mode. The first heat exchanger may be configured to heat airflow and the second heat exchanger may be configured to cool airflow in a heat pump operational mode, and the first heat exchanger may be configured to cool airflow and the second heat exchanger may be configured to heat airflow in a cold pump operational mode. The first heat exchanger may be disposed at a front end of the vehicle cabin that is configured to seat rear-facing occupants when a vehicle including the vehicle cabin is traveling in a forward direction, and the second heat exchanger may be disposed at a rear end of the vehicle cabin that is configured to seat front-facing occupants when the vehicle is traveling in the forward direction. The partition may block airflow from the second heat exchanger from the recirculation path so that airflow from the second heat exchanger follows the extraction path in the heat pump operational mode and the cold pump operational mode. The climate control system may include a bypass path configured to selectively route airflow around the second heat exchanger. The first heat exchanger may be configured to operate in a heating operational mode and a cooling operational mode, and the second heat exchanger may be configured to operate in the heating operational mode, the cooling operational mode, a heat-pump operational mode, and a cold-pump operational mode. The various features of the first aspect described in this paragraph can be implemented together or separately.

A second aspect of the disclosed embodiments is a climate control module including a pump configured to accelerate airflow received from a vehicle cabin, a heat exchanger configured to thermally condition airflow received from the pump, a recirculation path configured to direct airflow received from the heat exchanger back to the vehicle cabin, an exhaust path configured to direct airflow received from the heat exchanger to an exterior of the vehicle cabin, and a mode door controllable to selectively close the recirculation path or the exhaust path based on a mode of operation of the climate control module.

In the second aspect, the mode of operation may be one of heating, cooling, heating with recapture, cooling with recapture, cold pump, or heat pump. The heat exchanger may be configured to heat airflow in the heating, the heating with recapture, and the cold pump modes of operation. The heat exchanger may be configured to cool airflow in the cooling, the cooling with recapture, and the heat pump modes of operation. The various features of the second aspect described in this paragraph can be implemented together or separately.

A third aspect of the disclosed embodiments is climate control method that includes determining, based on sensor information from an interior of a vehicle cabin, that an air quality parameter is below an air quality threshold. Upon the air quality parameter being below the air quality threshold, the climate control method includes sending a command to a climate control system configured to cause a first portion of the climate control system to draw fresh air from an exterior of the vehicle cabin through a first filter and into the vehicle cabin and cause a second portion of the climate control system to draw air from the vehicle cabin through a second filter and return the air to the vehicle cabin.

In the third aspect, the first filter may meet a high efficiency particulate air (HEPA) filtration rating, and the second filter may remove at least 95% of airborne particles per a United States National Institute for Occupational Safety and Health (NIOSH) filtration rating. The method may include receiving, from a sensor in the vehicle cabin, the sensor information including the air quality parameter and determining, based on the sensor information from the interior of the vehicle cabin, that the air quality parameter is above the air quality threshold. Upon the air quality parameter being above the air quality threshold, the method may include sending a command to the climate control system configured to cause the second portion of the climate control system to vent the air from the vehicle cabin to the exterior of the vehicle cabin. The first portion of the climate control system may be configured to draw air from the exterior of the vehicle cabin through at least one of a first pump and a first heat exchanger, and the second portion of the climate control system may be configured to draw air from the vehicle cabin through at least one of a second pump and a second heat exchanger. The various features of the third aspect described in this paragraph can be implemented together or separately.

DETAILED DESCRIPTION

Climate control systems are described that include selectively activated mode doors or partitions to direct airflow either to recirculation paths back into a vehicle cabin or extraction or exhaust paths that vent airflow from a vehicle cabin. The extraction or exhaust paths can control pressure within a vehicle cabin by venting airflow that has been thermally conditioned to achieve cabin comfort and optionally thermally conditioned to recapture heat or cold, for example, in heat pump or cold pump operational modes of the climate control system. Recapturing heat or cold from airflow exiting the vehicle cabin can improve overall operating efficiency of the climate control system, and in some cases, of other systems in the vehicle such as battery or powertrain systems.

Figure 1:
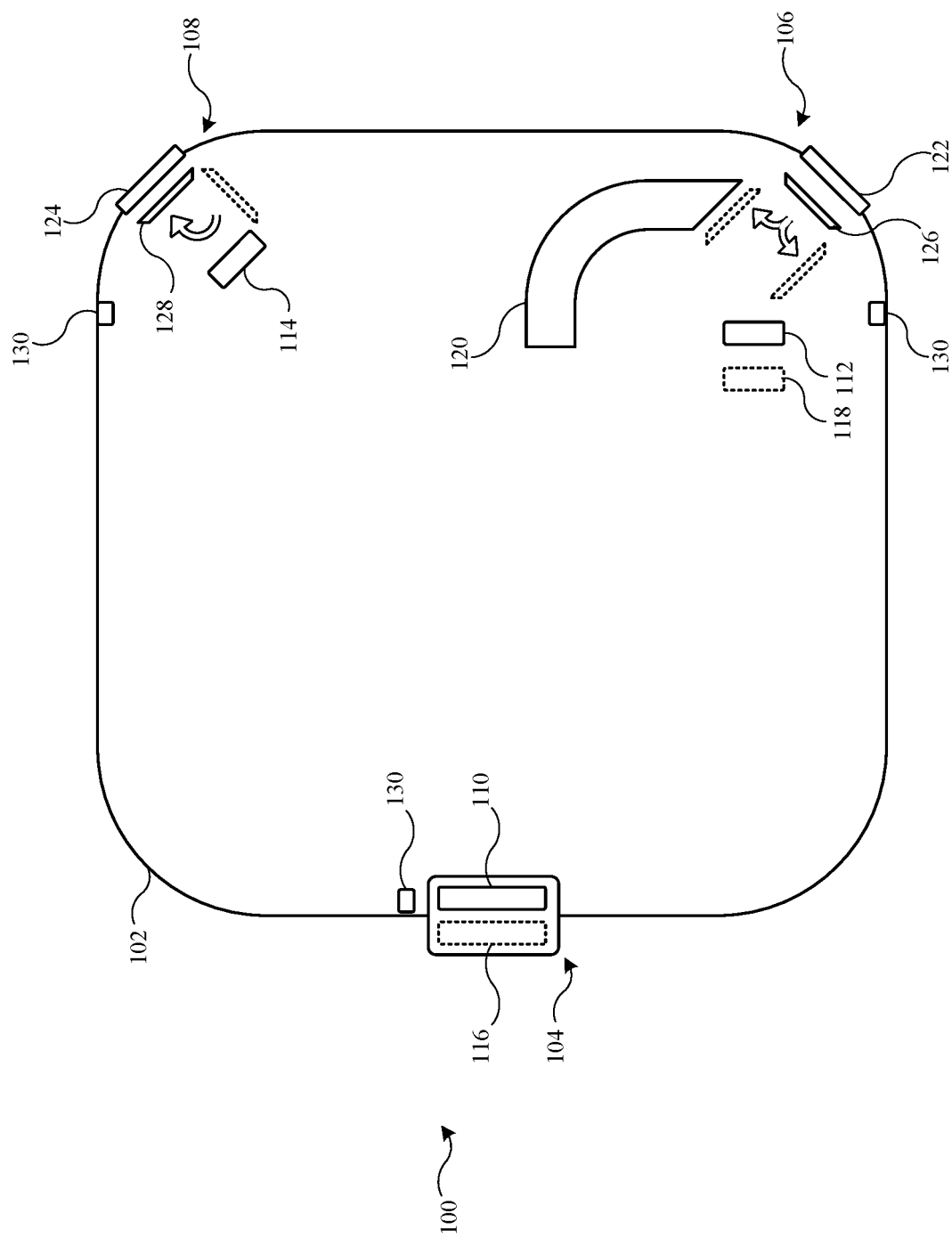
FIG. 1 is a schematic of a climate control system for use with a vehicle cabin.

FIG. 1 is a schematic of a climate control system 100 for use with a vehicle cabin 102. The climate control system 100 includes a front module 104 and rear modules 106, 108 including heat exchangers 110, 112, 114 and, optionally as shown in dotted line, pumps and/or filters 116, 118. The heat exchangers 110, 112, 114 and the pumps and/or filters 116, 118 are shown in ordered combinations located within or adjacent to the respective front module 104 and rear modules 106, 108. The front module 104 is located at a first end, here, a front end of the vehicle cabin 102 that can seat rear-facing users or occupants (not shown) when the vehicle is traveling in a forward direction. The rear modules 106, 108 are spaced from each other and located at a second end, here, a rear end of the vehicle cabin 102 that can seat front-facing users or occupants (not shown) when the vehicle is traveling in a forward direction.

The components are shown schematically, without thermal loops, detailed ducts, vents, or other flow directing devices and without links to other climate conditioning sources to allow higher-level descriptions of various climate conditioning processes implemented using the climate control system 100. It is understood that the heat exchangers 110, 112, 114 and the pumps and/or filters 116, 118 can be higher in number, lower in number, absent, arranged in different locations, or equipped with different features. For example, the heat exchangers 110, 112, 114 can selectively operate as gas coolers, condensers, or evaporators depending on operational mode of the climate control system 100. The heat exchanger 110 can include or comprise an accumulator. The components of the climate control system 100, including any of the heat exchangers 110, 112, 114 can be in thermal communication with additional components (not shown), such as radiators, evaporators, condensers, chillers, or heat sources such as battery components or powertrain components, in order to supplement and/or improve climate conditioning performance of the climate control system 100.

The pumps and/or filters 116, 118 can include pumps (not shown) sufficient to accelerate airflow using suction or other pressure-differential causing mechanisms (not shown). In some examples, the pump and/or filter 116 includes a first type of filter configured to meet a high efficiency particulate air (HEPA) filtration rating and the pump and/or filter 118 includes a second type of filter configured to remove at least 95% of airborne particles per a United States National Institute for Occupational Safety and Health (NIOSH) filtration rating. The first type of filter, or first filter, can be configured to remove pollution, smoke, smog, and particulates that reduce air quality in the environment external to the vehicle cabin 102. The second type of filter, or second filter, can be configured to remove airborne particles from airflow within the vehicle cabin 102, such as introduced by users in the vehicle cabin 102, in order to more quickly achieve a predetermined air quality parameter associated, for example, with a low level of particulates suitable for easier breathing by the users in the vehicle cabin 102.

The front module 104 is configured to receive fresh airflow (not shown) from an external environment surrounding the vehicle cabin 102. The fresh airflow from the external environment can pass first through the optional pump and/or filter 116, then through the heat exchanger 110 for thermal conditioning, to become cabin airflow (not shown) within the vehicle cabin 102 to provide user comfort, for example, at the front end of the vehicle cabin 102. Once in the vehicle cabin 102, the cabin airflow can be subject to further thermal conditioning, for example, by passing through the optional pump and/or filter 118 before passing through the heat exchanger 112. The cabin airflow can also be subject to further thermal conditioning, for example, by passing through the heat exchanger 114. An operational mode of the climate control system 100 can dictate whether, for example, the cabin airflow is routed to pass through the heat exchanger 112, the heat exchanger 114, or both, during thermal conditioning using one or more of the rear modules 106, 108.

The cabin airflow passing through one or more of the rear modules 106, 108 can be guided by a pressure differential between the vehicle cabin 102 and the external environment or suctioned or otherwise drawn by the optional pump and/or filter 118 or a separate fan or a blower (not shown) to follow at least one of a recirculation path 120 that returns the cabin airflow to the vehicle cabin 102 to support user comfort at a rear end of the vehicle cabin 102 or extraction or exhaust paths 122, 124 configured to vent airflow to the external environment outside of the vehicle cabin 102. The extraction or exhaust paths 122, 124 may include extractors or exhausters (not shown) with one-way or directional capabilities to allow airflow from the vehicle cabin 102 to vent to the external environment. The extractors or exhausters may, for example, be injection molded polymer components, including flaps, vanes, valves, or other flow control devices (not shown) to facilitate venting from the vehicle cabin 102.

To direct cabin airflow between the recirculation path 120 and the extraction or exhaust paths 122, 124, the rear modules 106, 108 can include one or more mode doors or partitions 126, 128 that are controllable, e.g., movable, as shown in dotted line and using directional arrows, to selectively block the recirculation path 120 and/or respective ones of the extraction or exhaust paths 122, 124 depending on operational mode of the climate control system 100. The mode doors or partitions 126, 128 may be hinged, rotatable, or slidable and include seals or other dampening materials (not shown) suitable to selectively, that is controllably, cover various ones of the paths 120, 122, 124 to selectively prohibit airflow from entering the covered path. Though two partitions 126, 128 and two extraction or exhaust paths 122, 124 are shown, various configurations of the climate control system 100 can include none, one, or more than one of the partitions 126, 128 and one or more of the extraction or exhaust paths 122, 124. The partitions 126, 128 may be of unitary construction or include independently movable sections (not shown).

The recirculation path 120 can include a duct or other routing mechanism (not shown) configured to direct airflow from a location downstream of the heat exchanger 112 to a central location within the vehicle cabin 102 or to vents or outlets (not shown) that can be positioned by users within the vehicle cabin 102 to achieve thermal comfort. The exhaust paths 122, 124 can be configured to direct airflow from locations downstream of the heat exchangers 112, 114 to one-way exhausters (not shown) configured to relieve pressure from the vehicle cabin 102 such as caused by introduction of fresh airflow from the front module 104. Selective use of one or more of the exhaust paths 122, 124 can avoid pressure buildup within the vehicle cabin 102 that can cause an increase in door closing efforts, undue strain on window and door seals, etc., while at the same time improving performance of the climate control system 100 in various operational modes as described further herein.

The climate control system 100 of FIG. 1 includes one or more sensors 130 that are configured capture or receive sensor information. Though three sensors 130 are shown, more or fewer are possible. The sensor information captured or received by the sensors 130 can be associated with cabin conditions or users within the vehicle cabin 102. For example, the sensor information captured or received by the sensors 130 can relate to particulate presence and type, particulate concentration, temperature, humidity, airflow, or other ambient conditions within the vehicle cabin 102 relevant to air quality. In another example, the sensor information captured or received by the sensors 130 can relate to user presence, user location within the vehicle cabin 102, or user comfort parameters such as drowsiness, alertness, skin temperature, etc. usable to support a determination of an operational mode to implement with the climate control system 100.

FIGS. 2A and 2B are operational schematics of a climate control system 200 for use with a vehicle cabin 202. The climate control system 200 is similar to the climate control system 100 of FIG. 1, and the vehicle cabin 202 is similar to the vehicle cabin 102 of FIG. 1, so component similarities will be described only briefly. The climate control system 200 includes a front module 204, rear modules 206, 208, heat exchangers 210, 212, pumps and/or filters 216, 218, a recirculation path 220, extraction or exhaust paths 222, 224, and a mode door or partition 226 controllable to selectively block or close the recirculation path 220 or the extraction or exhaust path 222 based on a mode of operation, i.e., an operational mode, of the climate control system 200.

Figure 2:
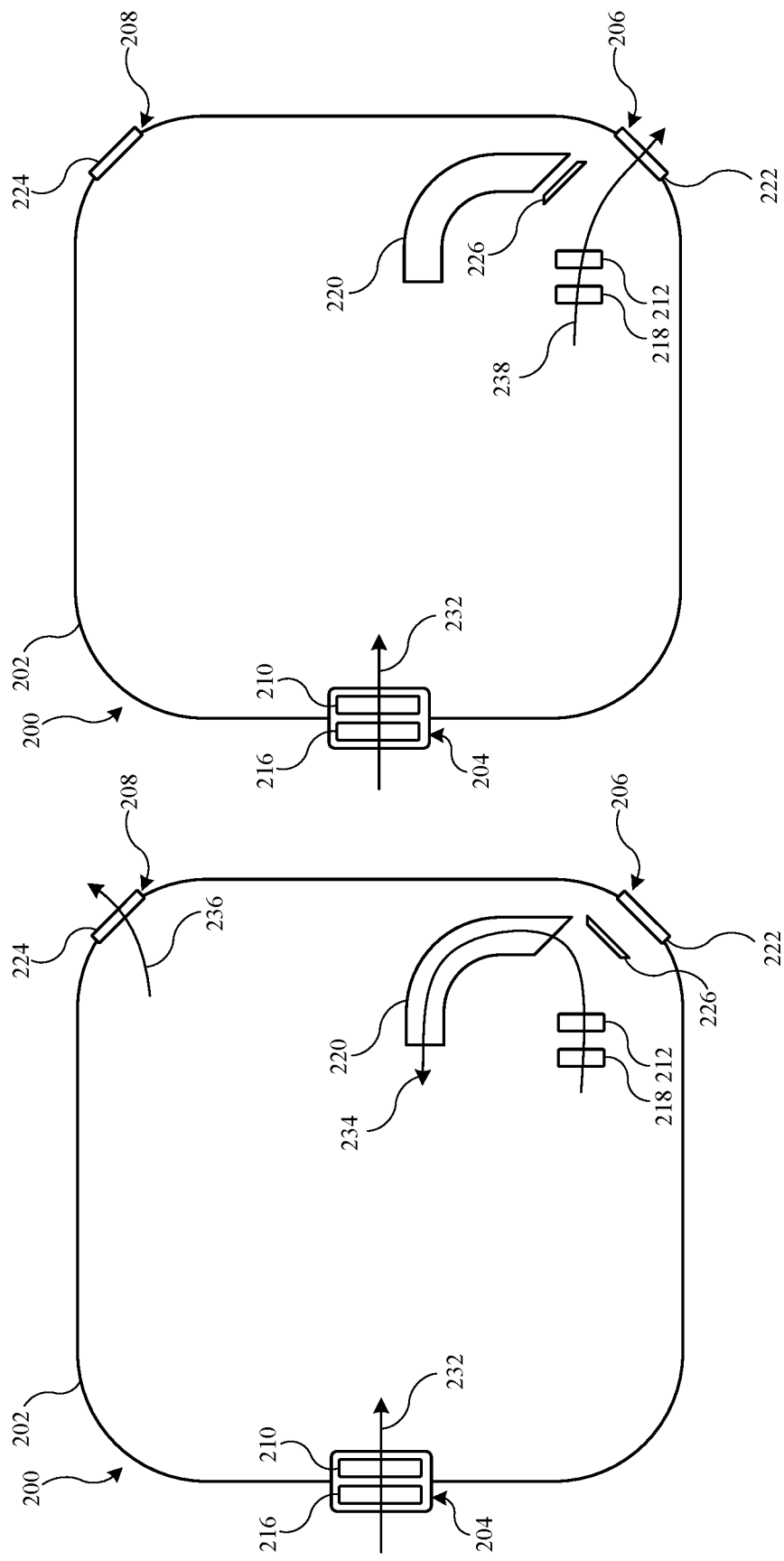
FIGS. 2A and 2B are operational schematics of a climate control system for use with a vehicle cabin.

In the climate control system 200 of FIG. 2, as well as in additional climate control systems described herein, one or more thermal loops (not shown) can circulate a working fluid, such as refrigerant, between the heat exchangers 210, 212 and other components (not shown) to effect temperature control. Circulation, evaporation, and condensation of the working fluid in the thermal loop can be achieved using the heat exchangers 210, 212 along with a flow control system that includes one or more compression devices and one or more expansion devices or valves (not shown). For example, the compression device(s) can be configured to pressurize the working fluid in the thermal loop. The expansion device(s) or valves can be configured to de-pressurize and/or guide the working fluid in the thermal loop. Multiple thermal loops may be present. Changes in pressure of the working fluid in the thermal loop allow changes in temperature of airflow to be implemented using the heat exchangers 210, 212 consistent with the operational modes of the climate control system 200 and additional climate control systems described herein.

In FIG. 2A, the climate control system 200 is shown operating in a heating mode or a cooling mode, that is, the operational modes associated with FIG. 2A are heating or cooling. In the heating mode, the heat exchanger 210 in the front module 204 selectively operates or functions as a gas cooler, a condenser, or combinations thereof to warm airflow from the external environment. In the cooling mode, the heat exchanger 210 selectively operates or functions as an evaporator to cool airflow from the external environment as it enters the vehicle cabin 202 as indicated using an arrow 232 that passes through the pump and/or filter 216 and the heat exchanger 210.

In the heating mode, the heat exchanger 212 in the rear module 206 also selectively operates or functions as a gas cooler, a condenser, or combinations thereof, warming (i.e., re-warming) airflow from the vehicle cabin 202. In the cooling mode, the heat exchanger 212 selectively operates or functions as an evaporator to cool airflow from the vehicle cabin 202 as indicated using an arrow 234 that passes through the pump and/or filter 218 (generally activated to ensure recirculation is achieved) and the heat exchanger 212. The heated or cooled (i.e., re-heated or re-cooled) airflow from the heat exchanger 212 re-enters the vehicle cabin 202 through the recirculation path 220, efficiently warming or cooling a portion of the vehicle cabin 202 proximate to the rear module 206. The term "proximate" is used to indicate a position in front of, adjacent to, or nearby the rear module 206.

In the heating and cooling modes, the mode door or partition 226 of the rear module 206 is controlled, for example, based on a command from a controller (not shown) associated with the climate control system 200, to block the extraction or exhaust path 222 so that little to none of the heated or cooled (i.e., re-heated or re-cooled) airflow passing through the heat exchanger 212 exits the vehicle cabin 202 through the extraction or exhaust path 222 of the rear module 206. Blocking the extraction or exhaust path 222 improves heating or cooling efficiency of the climate control system 200. To maintain predetermined pressure levels within the vehicle cabin 202 in the heating and cooling modes of FIG. 2A, heated or cooled (i.e., re-heated or re-cooled) airflow from the vehicle cabin 202 will be drawn (e.g., by pressure differential) through the one-way extraction or exhaust path 224 of the rear module 208 indicated using an arrow 236 to vent airflow from the vehicle cabin 202 to the environment external to the vehicle cabin 202.

The heating and cooling modes described with respect to FIG. 2A improve comfort within the vehicle cabin 202 since users located both at a front end and a rear end of the vehicle cabin 202 can receive heated or cooled airflow. The use of the extraction or exhaust path 224 that is spaced apart from the selectively closed or blocked extraction or exhaust path 222 and spaced apart from the recirculation path 220 avoids premature venting of thermally conditioned airflow until after users in the rear end of the vehicle cabin 202 have received benefit from such airflow.

In FIG. 2B, the climate control system 200 is shown operating in a heat pump mode or a cold pump mode, for example, in a cold environment or a hot environment, respectively. A heat pump or a cold pump can circulate a working fluid, such as refrigerant, through cycles of evaporation or heating to absorb heat and condensation or cooling to release heat.

To operate the climate control system 200 in the heat pump mode, the heat exchanger 210 selectively operates or functions as a gas cooler, a condenser, or combinations thereof to warm the airflow that enters the front module 204, as indicated using the arrow 232, and passes through the pump and/or filter 216 and the heat exchanger 210 while the heat exchanger 212 selectively operates or functions as an evaporator to cool or receive heat from the airflow that exits the vehicle cabin 202 through the extraction or exhaust path 222 indicated using an arrow 238 that passes through the pump and/or filter 218 and the heat exchanger 212.

To operate the climate control system 200 in the cold pump mode, the heat exchanger 210 selectively operates or functions as an evaporator to cool the airflow that enters the front module 204, as indicated using the arrow 232, and passes through the pump and/or filter 216 and the heat exchanger 210 while the heat exchanger 212 selectively operates or functions as a gas cooler, a condenser, or combinations thereof to warm the airflow that exits the vehicle cabin 202 through the extraction or exhaust path 222, indicated using the arrow 238 that passes through the pump and/or filter 218 and the heat exchanger 212.

In both the heat pump and cold pump examples, the recirculation path 220 is selectively closed or blocked by the mode door or partition 226 to prevent airflow from returning to the vehicle cabin 202. The position of the mode door or partition 226 differs from that shown in FIG. 2A for the heating and cooling modes, that is, the mode door or partition 226 moves from blocking the extraction or exhaust path 222 in FIG. 2A to blocking the recirculation path 220 in FIG. 2B. The heat or cold collected or reclaimed by the heat exchanger 212 in the rear module 206 in the heat pump and cold pump operational modes can be put to other uses in the vehicle, including for continued use in optimizing performance of the climate control system 200.

A benefit of operating the climate control system 200 as a heat pump is improved durability in cold external environments. The heat exchanger 212 does not experience frost-and-thaw cycles since the airflow passing through the heat exchanger 212 is generally warmer than the air in cold external environments. Avoiding frost-and-thaw cycles saves power and increases efficiency of the climate control system 200. The heat pump operational mode of the climate control system 200 also controls humidity levels within the vehicle cabin 202. Further, reclaiming or collecting heat from the airflow that exits the vehicle cabin 202 is useful in vehicles with hybrid or electric powertrains, since in contrast to vehicles with internal-combustion engines, little or no excess or waste heat is available from the powertrain for use by the climate control system 200.

A benefit of operating the climate control system 200 as a cold pump is that a higher efficiency can be achieved for the climate control system 200 by heating the airflow that exits the vehicle cabin 202 through the extraction or exhaust path 222. For example, rejecting heat from a thermal loop (not shown) that includes the heat exchanger 212 supports lower power requirements for compression device(s) (not shown), as a pressurized portion of the thermal loop can be operated at a lower pressure.

Figure 3:
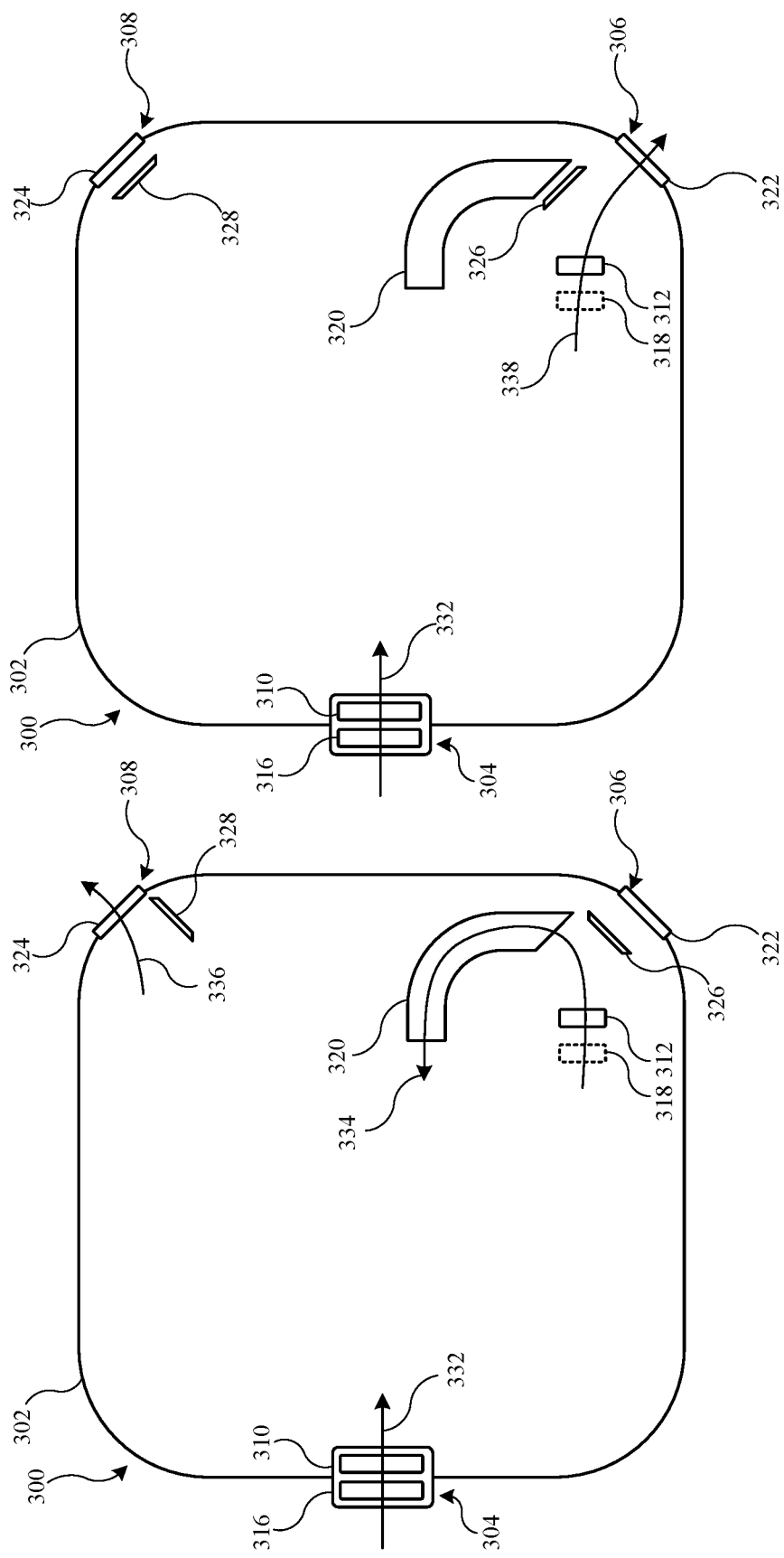
FIGS. 3A and 3B are operational schematics of a climate control system for use with a vehicle cabin.

FIGS. 3A and 3B are operational schematics of a climate control system 300 for use with a vehicle cabin 302. The climate control system 300 is similar to the climate control systems 100, 200 of FIGS. 1 to 2B, and the vehicle cabin 302 is similar to the vehicle cabins 102, 202 of FIGS. 1 to 2B, so component similarities will be described only briefly. The climate control system 300 includes a front module 304, rear modules 306, 308, heat exchangers 310, 312, pumps and/or filters 316, 318, with operation of the pump and/or filter 318 being optional as indicated in dotted line, a recirculation path 320, extraction or exhaust paths 322, 324, and mode doors or partitions 326, 328 controllable to selectively block or close the recirculation path 320, the extraction or exhaust path 322, or the extraction or exhaust path 324 based on a mode of operation of the climate control system 300.

In FIG. 3A, the climate control system 300 is shown operating in a heating mode or a cooling mode, that is, the operational modes associated with FIG. 3A are heating or cooling. In the heating mode, the heat exchanger 310 in the front module 304 selectively operates or functions as a gas cooler, a condenser, or combinations thereof to warm airflow from the external environment. In the cooling mode, the heat exchanger 310 selectively operates or functions as an evaporator to cool airflow from the external environment as it enters the vehicle cabin 302 as indicated using an arrow 332 that passes through the pump and/or filter 316 and the heat exchanger 310.

In the heating mode, the heat exchanger 312 in the rear module 306 also selectively operates or functions as a gas cooler, a condenser, or combinations thereof, warming (i.e., re-warming) airflow from the vehicle cabin 302. In the cooling mode, the heat exchanger 312 selectively operates or functions as an evaporator to cool airflow from the vehicle cabin 302 as indicated using an arrow 334 that passes through the pump and/or filter 318 and the heat exchanger 312. The heated or cooled (i.e., re-heated or re-cooled) airflow from the heat exchanger 312 re-enters the vehicle cabin 302 through the recirculation path 320, efficiently warming or cooling a portion of the vehicle cabin 302 proximate to the rear module 306.

In the heating and cooling modes, the mode door or partition 326 of the rear module 306 is controlled, for example, based on a command from a controller (not shown) associated with the climate control system 300, to block the extraction or exhaust path 322. The mode door or partition 328 is at the same time controlled to open the extraction or exhaust path 324. In the heating or cooling modes, airflow from the vehicle cabin 302 will be drawn (e.g., by pressure differential) past the open mode door or partition 328 through the one-way extraction or exhaust path 324 of the rear module 308 indicated using an arrow 336 to vent airflow from the vehicle cabin 302 to the environment external to the vehicle cabin 302.

In FIG. 3B, the climate control system 300 is shown operating in a heat pump mode or a cold pump mode, for example, in a cold environment or a hot environment, respectively. To operate the climate control system 300 in the heat pump mode, the heat exchanger 310 selectively operates or functions as a gas cooler, a condenser, or combinations thereof to warm the airflow that enters the front module 304, as indicated using the arrow 332, and passes through the pump and/or filter 316 and the heat exchanger 310 while the heat exchanger 312 selectively operates or functions as an evaporator to cool or receive heat from the airflow that exits the vehicle cabin 302 through the extraction or exhaust path 322 indicated using an arrow 338 that passes through the optionally deactivated pump and/or filter 318 and the heat exchanger 312.

To operate the climate control system 300 in the cold pump mode, the heat exchanger 310 selectively operates or functions as an evaporator to cool the airflow that enters the front module 304, as indicated using the arrow 332, and passes through the pump and/or filter 316 and the heat exchanger 310 while the heat exchanger 312 selectively operates or functions as a gas cooler, a condenser, or combinations thereof to warm the airflow that exits the vehicle cabin 302 through the extraction or exhaust path 322, indicated using the arrow 338 that passes through the optionally deactivated pump and/or filter 318 and the heat exchanger 312.

In both the heat pump example and the cold pump example, the recirculation path 320 is selectively closed or blocked by the mode door or partition 326 to prevent airflow from returning to the vehicle cabin 302 and the extraction or exhaust path 324 is selectively closed or blocked by the mode door or partition 328 to force airflow to vent through the extraction or exhaust path 322. By selectively blocking the extraction or exhaust path 324 (and opening the extraction or exhaust path 322) in the heat pump operational mode and the cold pump operational mode, the pump and/or filter 318 may not need to be activated, as shown in dotted line, since the only vent from the vehicle cabin 302 is the extraction or exhaust path 322 and a pressure differential between the vehicle cabin 302 and an external environment outside of the vehicle cabin 302 may be sufficient to drive airflow through the rear module 306.

In FIG. 3B, the positions of the mode doors or partitions 326, 328 differ from the positions shown in FIG. 3A for the heating and cooling modes, that is, the mode door or partition 326 moves from blocking the extraction or exhaust path 322 in FIG. 3A to blocking the recirculation path 320 in FIG. 3B and the mode door or partition 328 moves from blocking the extraction or exhaust path 324 to opening the extraction or exhaust path 324. The heat or cold collected or reclaimed by the heat exchanger 312 in the rear module 306 in the heat pump and cold pump operational modes can be put to other uses in the vehicle, including for continued use in optimizing performance of the climate control system 300. Other benefits of the heat pump and cold pump operational modes are similar to those described with respect to the climate control system 200 in FIGS. 2A and 2B.

Figure 4:
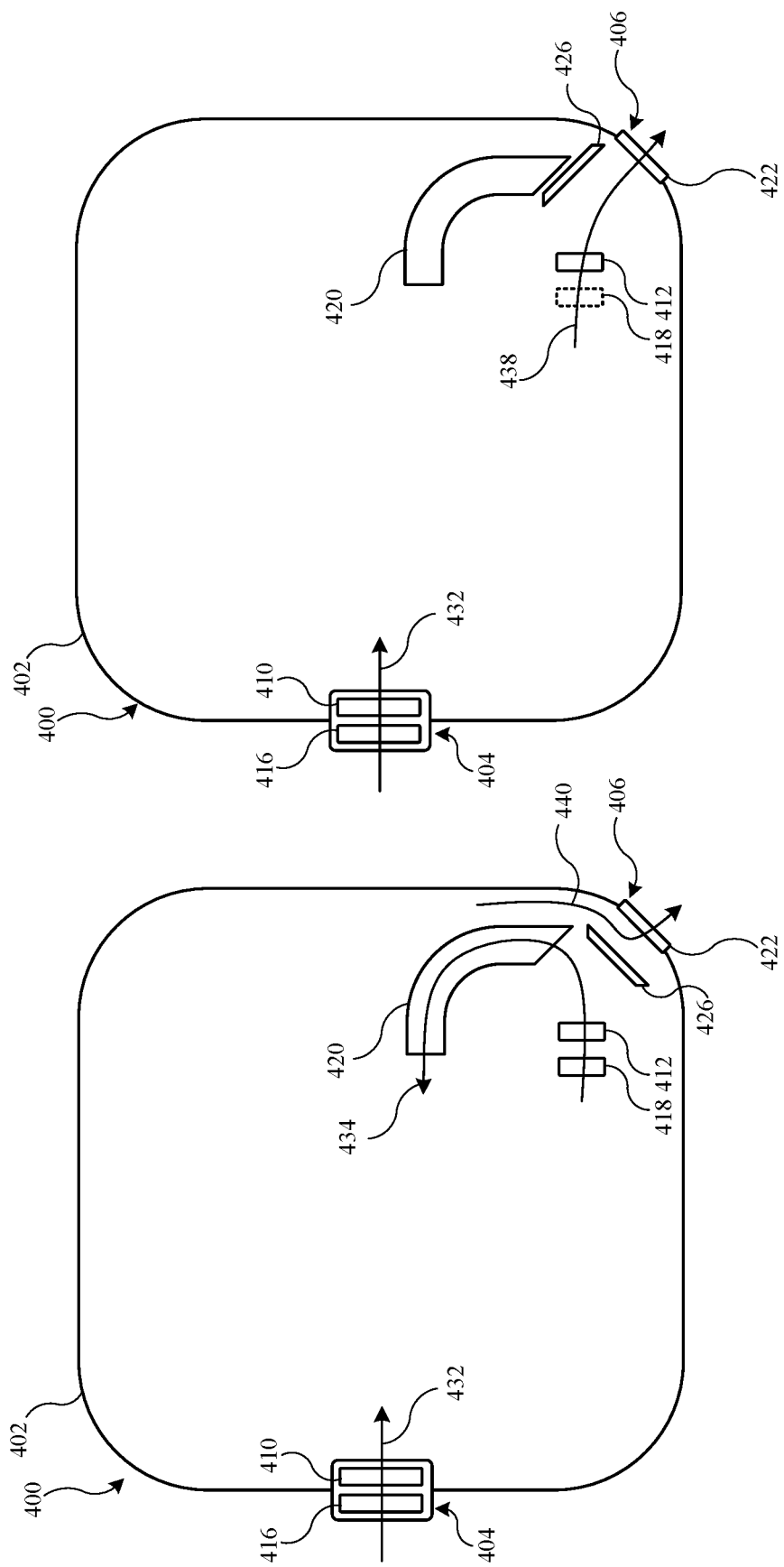
FIGS. 4A and 4B are operational schematics of a climate control system for use with a vehicle cabin.

FIGS. 4A and 4B are operational schematics of a climate control system 400 for use with a vehicle cabin 402. The climate control system 400 is similar to the climate control systems 100, 200, 300 of FIGS. 1 to 3B, and the vehicle cabin 402 is similar to the vehicle cabins 102, 202, 302 of FIGS. 1 to 3B, so component similarities will be described only briefly. The climate control system 400 includes a front module 404, a rear module 406, heat exchangers 410, 412, pumps and/or filters 416, 418, with operation of the pump and/or filter 418 being optional as indicated in dotted line, a recirculation path 420, an extraction or exhaust path 422, and a mode door or partition 426 controllable to selectively block or close the recirculation path 420 or the extraction or exhaust path 422 based on a mode of operation of the climate control system 400. The mode door or partition 426 may be larger or have a different shape than the mode doors or partitions 126, 226, 326 of FIGS. 1 to 3B or may include multiple portions to achieve the flow paths described with respect to FIGS. 4A and 4B.

In FIG. 4A, the climate control system 400 is shown operating in a heating mode or a cooling mode, that is, the operational modes associated with FIG. 4A are heating or cooling. In the heating mode, the heat exchanger 410 in the front module 404 selectively operates or functions as a gas cooler, a condenser, or combinations thereof to warm airflow from the external environment. In the cooling mode, the heat exchanger 410 selectively operates or functions as an evaporator to cool airflow from the external environment as it enters the vehicle cabin 402 as indicated using an arrow 432 that passes through the pump and/or filter 416 and the heat exchanger 410.

In the heating mode, the heat exchanger 412 in the rear module 406 also selectively operates or functions as a gas cooler, a condenser, or combinations thereof, warming (i.e., re-warming) airflow from the vehicle cabin 402. In the cooling mode, the heat exchanger 412 selectively operates or functions as an evaporator to cool airflow from the vehicle cabin 402 as indicated using an arrow 434 that passes through the pump and/or filter 418 and the heat exchanger 412. The heated or cooled (i.e., re-heated or re-cooled) airflow from the heat exchanger 412 re-enters the vehicle cabin 402 through the recirculation path 420, efficiently warming or cooling a portion of the vehicle cabin 402 proximate to the rear module 406.

In the heating and cooling modes, the mode door or partition 426 (or portions of the mode door or partition 426) of the rear module 406 is controlled, for example, based on a command from a controller (not shown) associated with the climate control system 400, to divide the recirculation path 420 from the extraction or exhaust path 422. In the heating or cooling modes, airflow from the vehicle cabin 402 will be drawn (e.g., by pressure differential) behind the recirculation path 420 and through the one-way extraction or exhaust path 422 of the rear module 406 indicated using an arrow 440 to vent airflow from the vehicle cabin 402 to the environment external to the vehicle cabin 402. One benefit of the climate control system 400 of FIGS. 4A and 4B is the use of the single rear module 406 with the single extraction or exhaust path 422, that is, no extraction or exhaust path is present at an opposite side of the vehicle cabin 402 from the rear module 406.

In FIG. 4B, the climate control system 400 is shown operating in a heat pump mode or a cold pump mode, for example, in a cold environment or a hot environment, respectively. To operate the climate control system 400 in the heat pump mode, the heat exchanger 410 selectively operates or functions as a gas cooler, a condenser, or combinations thereof to warm the airflow that enters the front module 404, as indicated using the arrow 432, and passes through the pump and/or filter 416 and the heat exchanger 410 while the heat exchanger 412 selectively operates or functions as an evaporator to cool or receive heat from the airflow that exits the vehicle cabin 402 through the extraction or exhaust path 422 indicated using an arrow 438 that passes through the optionally deactivated pump and/or filter 418 and the heat exchanger 412.

To operate the climate control system 400 in the cold pump mode, the heat exchanger 410 selectively operates or functions as an evaporator to cool the airflow that enters the front module 404, as indicated using the arrow 432, and passes through the pump and/or filter 416 and the heat exchanger 410 while the heat exchanger 412 selectively operates or functions as a gas cooler, a condenser, or combinations thereof to warm the airflow that exits the vehicle cabin 402 through the extraction or exhaust path 422, indicated using the arrow 438 that passes through the optionally deactivated pump and/or filter 418 and the heat exchanger 412.

In both the heat pump and cold pump examples of FIG. 4B, the recirculation path 420 and the space behind the recirculation path 420 that directs airflow to vent from the vehicle cabin 402 are selectively closed or blocked by the mode door or partition 426 to prevent airflow from returning to the vehicle cabin 402 through the recirculation path 420 and to prevent airflow from reaching the extraction or exhaust path 422 from behind the recirculation path 420. By selectively blocking the recirculation path 420 and opening the shortest, direct path to the extraction or exhaust path 422 in the heat pump and cold pump operational modes, the pump and/or filter 418 may not need to be activated, as shown in dotted line, since the only venting path from the vehicle cabin 402 is the direct, short route from the heat exchanger 412 to the extraction or exhaust path 422 along the arrow 438 and pressure differential alone may be sufficient to drive airflow through the rear module 406 along this route.

In FIG. 4B, the position of the mode door or partition 426 differs from the position shown in FIG. 4A for the heating and cooling modes, that is, the mode door or partition 426 moves from blocking a more direct route to the extraction or exhaust path 422 in FIG. 4A to blocking the recirculation path 420 and a more indirect route behind the recirculation path 420 to the extraction or exhaust path 422 in FIG. 4B. The heat or cold collected or reclaimed by the heat exchanger 412 in the rear module 406 in the heat pump and cold pump operational modes can be put to other uses in the vehicle, including for continued use in optimizing performance of the climate control system 400. Other benefits of the heat pump and cold pump operational modes are similar to those described with respect to the climate control systems 200, 300 in FIGS. 2A to 3B.

Figure 5:
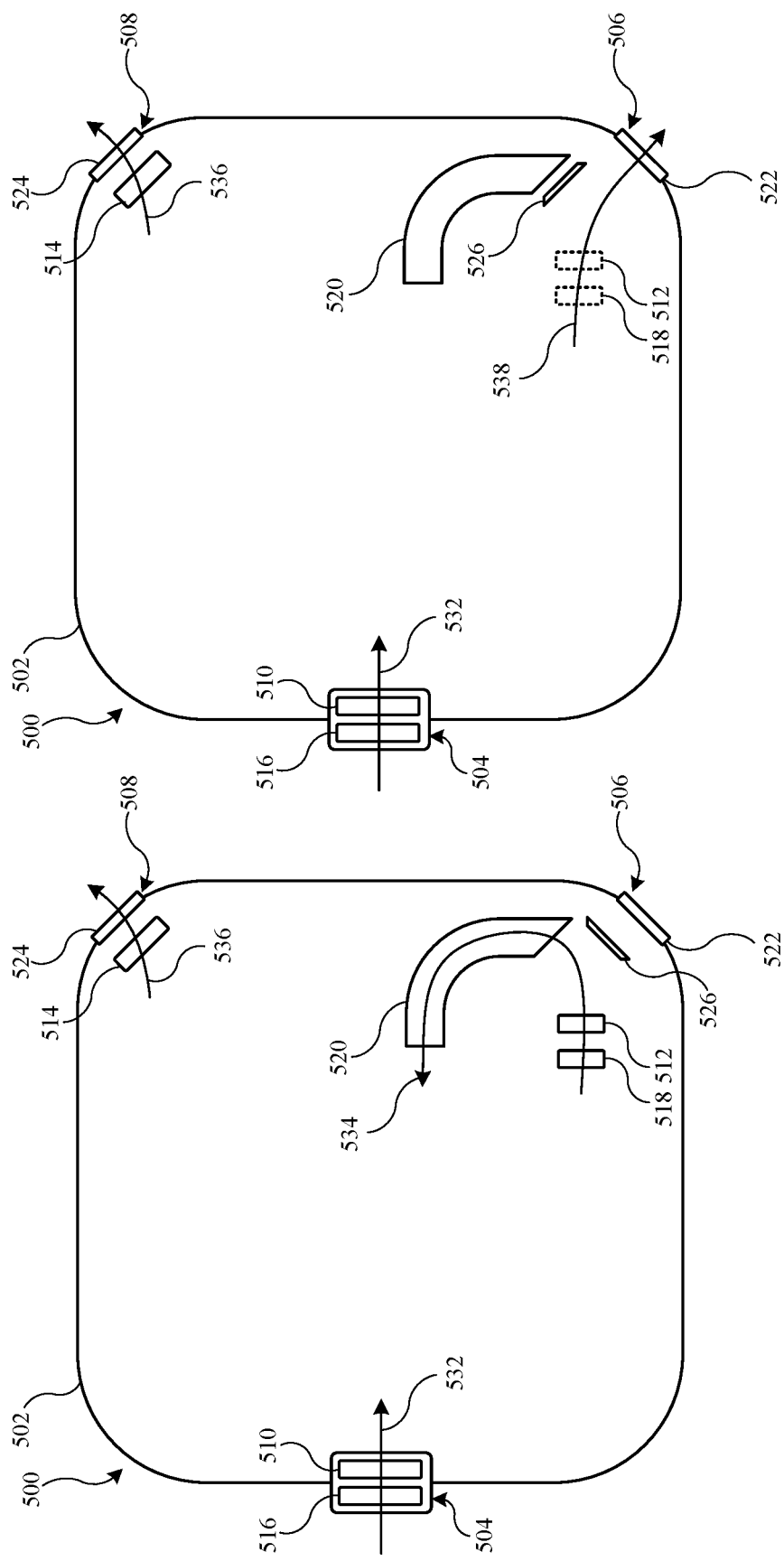
FIGS. 5A and 5B are operational schematics of a climate control system for use with a vehicle cabin.

FIGS. 5A and 5B are operational schematics of a climate control system 500 for use with a vehicle cabin 502. The climate control system 500 is similar to the climate control systems 100, 200, 300, 400 of FIGS. 1 to 4B, and the vehicle cabin 502 is similar to the vehicle cabins 102, 202, 302, 402 of FIGS. 1 to 4B, so component similarities will be described only briefly. The climate control system 500 includes a front module 504, rear modules 506, 508, heat exchangers 510, 512, 514, pumps and/or filters 516, 518, with operation of the pump and/or filter 518 being optional as indicated in dotted line, a recirculation path 520, extraction or exhaust paths 522, 524, and a mode door or partition 526 controllable to selectively block or close the recirculation path 520 or the extraction or exhaust path 522 based on a mode of operation of the climate control system 500.

In FIG. 5A, the climate control system 500 is shown operating in a heating mode with recapture or a cooling mode with recapture, that is, the operational modes associated with FIG. 5A are heating with recapture or cooling with recapture. In the heating mode with recapture, the heat exchanger 510 in the front module 504 selectively operates or functions as a gas cooler, a condenser, or combinations thereof to warm airflow from the external environment. In the cooling mode with recapture, the heat exchanger 510 selectively operates or functions as an evaporator to cool airflow from the external environment as it enters the vehicle cabin 502 as indicated using an arrow 532 that passes through the pump and/or filter 516 and the heat exchanger 510.

In the heating mode with recapture, the heat exchanger 512 in the rear module 506 also selectively operates or functions as a gas cooler, a condenser, or combinations thereof, warming (i.e., re-warming) airflow from the vehicle cabin 502. In the cooling mode with recapture, the heat exchanger 512 selectively operates or functions as an evaporator to cool airflow from the vehicle cabin 502 as indicated using an arrow 534 that passes through the pump and/or filter 518 and the heat exchanger 512. The heated or cooled (i.e., re-heated or re-cooled) airflow from the heat exchanger 512 re-enters the vehicle cabin 502 through the recirculation path 520, efficiently warming or cooling a portion of the vehicle cabin 502 proximate to the rear module 506.

In the heating with recapture and cooling with recapture modes, the mode door or partition 526 of the rear module 506 is controlled, for example, based on a command from a controller (not shown) associated with the climate control system 500, to block the extraction or exhaust path 522 to promote recirculation. In the heating with recapture and cooling with recapture modes, airflow from the vehicle cabin 502 will be drawn (e.g., by pressure differential) through the heat exchanger 514 before passing through the one-way extraction or exhaust path 524 of the rear module 508 indicated using an arrow 536 to vent airflow from the vehicle cabin 502 to the environment external to the vehicle cabin 502.

In the heating with recapture mode, the heat exchanger 514 selectively operates or functions as an evaporator to cool airflow from the vehicle cabin 502 to avoid losing heat to the external environment during venting. In the cooling with recapture mode, the heat exchanger 514 selectively operates or functions as a gas cooler, a condenser, or combinations thereof to warm the airflow from the vehicle cabin 502 to avoid losing cold air to the external environment during venting. Heating with recapture and cooling with recapture allow for higher overall efficiency of the climate control system 500.

In FIG. 5B, the climate control system 500 is shown operating in a heat pump mode or a cold pump mode, for example, in a cold environment or a hot environment, respectively. To operate the climate control system 500 in the heat pump mode, the heat exchanger 510 selectively operates or functions as a gas cooler, a condenser, or combinations thereof to warm the airflow that enters the front module 504, as indicated using the arrow 532, and passes through the pump and/or filter 516 and the heat exchanger 510 while the heat exchangers 512, 514 selectively operate or function as evaporators to cool or receive heat from the airflow that exits the vehicle cabin 502 through the extraction or exhaust paths 522, 524 indicated using the arrow 538 that passes through the pump and/or filter 518 and the heat exchanger 512 and the arrow 536 that passes through the heat exchanger 514.

To operate the climate control system 500 in the cold pump mode, the heat exchanger 510 selectively operates or functions as an evaporator to cool the airflow that enters the front module 504, as indicated using the arrow 532, and passes through the pump and/or filter 516 and the heat exchanger 510 while the heat exchangers 512, 514 selectively operate or function as gas coolers, condensers, or combinations thereof to warm the airflow that exits the vehicle cabin 502 through the extraction or exhaust paths 522, 524 indicated using the arrow 538 that passes through the pump and/or filter 518 and the heat exchanger 512 and the arrow 536 that passes through the heat exchanger 514.

In both the heat pump and cold pump examples, the recirculation path 520 is selectively closed or blocked by the mode door or partition 526 to prevent airflow from returning to the vehicle cabin 502. As both of the extraction or exhaust paths 522, 524 are available for venting, airflow through the vehicle cabin 502 may be relatively uniform, and the pump and/or filter 518 may not need to be activated, as shown in dotted line, since pressure differential may be sufficient to drive airflow through both of the rear modules 506, 508. In addition, the heat exchanger 512 may be optionally bypassed, as shown using dotted line, should reclamation of heat or cold be sufficient using only the heat exchanger 514 of the rear module 508. Bypass of the heat exchanger 512 can be referred to the airflow following a bypass path, that is, airflow from the vehicle cabin 502 can be selectively routed around the heat exchanger 512 should only the heat exchanger 514 be used for heat or cold reclamation during venting.

In FIG. 5B, the position of the mode door or partition 526 differs from the position shown in FIG. 5A for the heating with recapture and cooling with recapture modes, that is, the mode door or partition 526 moves from blocking the extraction or exhaust path 522 in FIG. 5A to blocking the recirculation path 520 in FIG. 5B. The heat or cold collected or reclaimed by the heat exchangers 512, 514 in the rear modules 506, 508 in the heat pump and cold pump operational modes can be put to other uses in the vehicle, including for continued use in optimizing performance of the climate control system 500. Other benefits of the heat pump and cold pump operational modes are similar to those described with respect to the climate control systems 200, 300, 400 in FIGS. 2A to 4B.

Figure 6:
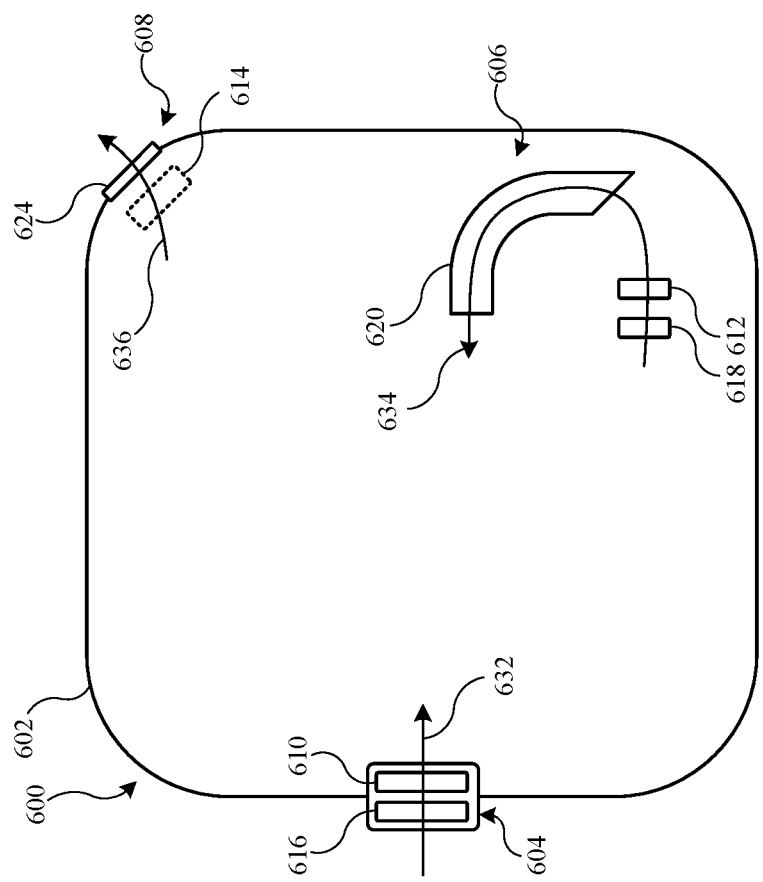
FIG. 6 is an operational schematic of a climate control system for use with a vehicle cabin.

FIG. 6 is an operational schematic of a climate control system 600 for use with a vehicle cabin 602. The climate control system 600 is similar to the climate control systems 100, 200, 300, 400, 500 of FIGS. 1 to 5B, and the vehicle cabin 602 is similar to the vehicle cabins 102, 202, 302, 402, 502 of FIGS. 1 to 5B, so component similarities will be described only briefly. The climate control system 600 includes a front module 604, rear modules 606, 608, heat exchangers 610, 612, 614, pumps and/or filters 616, 618, a recirculation path 620, and an extraction or exhaust path 624.

In FIG. 6, the climate control system 600 operational mode depends on selective use of the heat exchangers 610, 612, 614. For example, in the heating mode, the heat exchanger 610 in the front module 604 selectively operates or functions as a gas cooler, a condenser, or combinations thereof to warm airflow from the external environment. In the cooling mode, the heat exchanger 610 selectively operates or functions as an evaporator to cool airflow from the external environment as it enters the vehicle cabin 602 as indicated using an arrow 632 that passes through the pump and/or filter 616 and the heat exchanger 610.

In the heating mode, the heat exchanger 612 in the rear module 606 also selectively operates or functions as a gas cooler, a condenser, or combinations thereof, warming (i.e., re-warming) airflow from the vehicle cabin 602. In the cooling mode, the heat exchanger 612 selectively operates or functions as an evaporator to cool airflow from the vehicle cabin 602 as indicated using an arrow 634 that passes through the pump and/or filter 618 and the heat exchanger 612. The heated or cooled (i.e., re-heated or re-cooled) airflow from the heat exchanger 612 re-enters the vehicle cabin 602 through the recirculation path 620, efficiently warming or cooling a portion of the vehicle cabin 602 proximate to the rear module 606.

In the heating or cooling modes, airflow from the vehicle cabin 602 will be drawn (e.g., by pressure differential) through the heat exchanger 614, or optionally, around a bypass path (not shown) to circumvent the heat exchanger 614, before continuing to the one-way extraction or exhaust path 624 of the rear module 608 indicated using an arrow 636 to vent airflow from the vehicle cabin 602 to the environment external to the vehicle cabin 602. One benefit of the climate control system 600 of FIG. 6 is the use of the single extraction or exhaust path 624, that is, no extraction or exhaust path is present at an opposite side of the vehicle cabin 602 from the rear module 606.

The climate control system 600 of FIG. 6 can also operate in a heating with heat pump mode or a cooling with cold pump mode. To operate the climate control system 600 in the heating with heat-pump mode, the heat exchangers 610, 612 selectively operate or function as gas coolers, condensers, or combinations thereof to warm the airflow that enters the front module 604, indicated using the arrow 632, and the rear module 606, indicated using the arrow 634. That is, the recirculation path 620 is also used for heating the vehicle cabin 602. At the same time, the heat exchanger 614 in the rear module 608 selectively operates or functions as an evaporator to cool or receive heat from the airflow that exits the vehicle cabin 602 through the extraction or exhaust path 624 indicated using the arrow 636.

To operate the climate control system 600 in the cooling with cold pump mode, the heat exchangers 610, 612 selectively operate or function as evaporators to cool the airflow that enters the front module 604, indicated using the arrow 632, and the rear module 606, indicated using the arrow 634. That is, the recirculation path 620 is also used for cooling the vehicle cabin 602. At the same time, the heat exchanger 614 in the rear module 608 selectively operates or functions as a gas cooler, condenser, or combinations thereof to warm the airflow that exits the vehicle cabin 602 through the extraction or exhaust path 624 indicated using the arrow 636.

The heat or cold collected or reclaimed by the heat exchanger 614 in the rear module 608 in the heating with heat pump and cooling with cold pump operational modes can be put to other uses in the vehicle, including for continued use in optimizing performance of the climate control system 600. Other benefits of the heating with heat pump and cooling with cold pump operational modes are similar to those described with respect to the climate control systems 200, 300, 400, 500 in FIGS. 2A to 5B.

Figure 7:
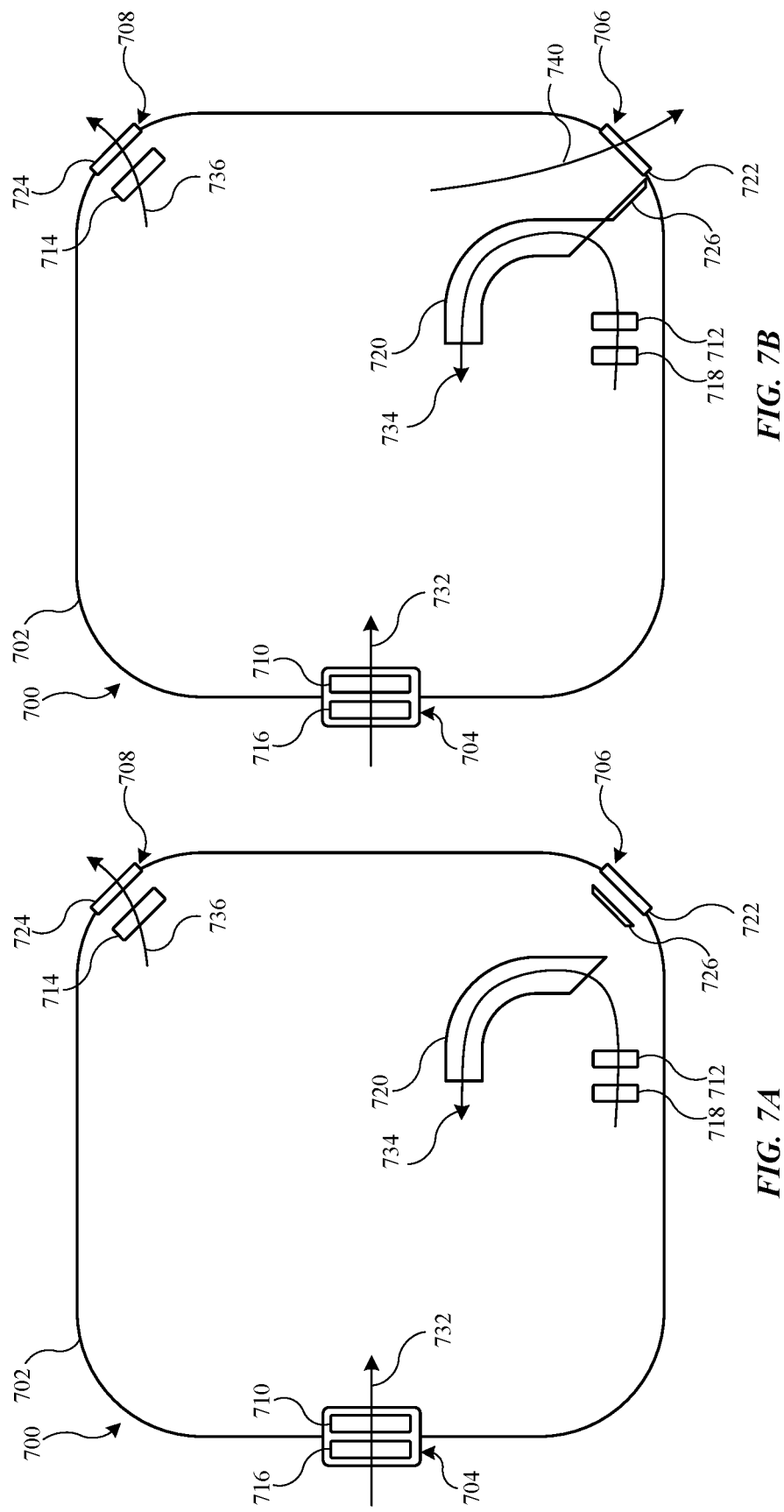
FIGS. 7A and 7B are operational schematics of a climate control system for use with a vehicle cabin.

FIGS. 7A and 7B are operational schematics of a climate control system 700 for use with a vehicle cabin 702. The climate control system 700 is similar to the climate control systems 100, 200, 300, 400, 500, 600 of FIGS. 1 to 6, and the vehicle cabin 702 is similar to the vehicle cabins 102, 202, 302, 402, 502, 602 of FIGS. 1 to 6, so component similarities will be described only briefly. The climate control system 700 includes a front module 704, rear modules 706, 708, heat exchangers 710, 712, 714, pumps and/or filters 716, 718, a recirculation path 720, extraction or exhaust paths 722, 724, and a mode door or partition 726 controllable to selectively block or close the extraction or exhaust path 722 based on a mode of operation of the climate control system 700.

In FIG. 7A, the climate control system 700 is shown operating in a heating mode with recapture or a cooling mode with recapture, that is, the operational modes associated with FIG. 7A are heating with recapture or cooling with recapture. In the heating mode with recapture, the heat exchanger 710 in the front module 704 selectively operates or functions as a gas cooler, a condenser, or combinations thereof to warm airflow from the external environment. In the cooling mode with recapture, the heat exchanger 710 selectively operates or functions as an evaporator to cool airflow from the external environment as it enters the vehicle cabin 702 as indicated using an arrow 732 that passes through the pump and/or filter 716 and the heat exchanger 710.

In the heating mode with recapture, the heat exchanger 712 in the rear module 706 also selectively operates or functions as a gas cooler, a condenser, or combinations thereof, warming (i.e., re-warming) airflow from the vehicle cabin 702. In the cooling mode with recapture, the heat exchanger 712 selectively operates or functions as an evaporator to cool airflow from the vehicle cabin 702 as indicated using an arrow 734 that passes through the pump and/or filter 718 and the heat exchanger 712. The heated or cooled (i.e., re-heated or re-cooled) airflow from the heat exchanger 712 re-enters the vehicle cabin 702 through the recirculation path 720, efficiently warming or cooling a portion of the vehicle cabin 702 proximate to the rear module 706.

In the heating with recapture and cooling with recapture modes, the mode door or partition 726 of the rear module 706 is controlled, for example, based on a command from a controller (not shown) associated with the climate control system 700, to block the extraction or exhaust path 722 to promote recirculation. In the heating with recapture and cooling with recapture modes, airflow from the vehicle cabin 702 will be drawn (e.g., by pressure differential) through the heat exchanger 714 before passing through the one-way extraction or exhaust path 724 of the rear module 708 indicated using an arrow 736 to vent airflow from the vehicle cabin 702 to the environment external to the vehicle cabin 702.

In the heating with recapture mode, the heat exchanger 714 selectively operates or functions as an evaporator to cool airflow from the vehicle cabin 702 to avoid losing heat to the external environment during venting. In the cooling with recapture mode, the heat exchanger 714 selectively operates or functions as a gas cooler, a condenser, or combinations thereof to warm the airflow from the vehicle cabin 702 to avoid losing cold air to the external environment during venting. Heating with recapture and cooling with recapture allow for higher overall efficiency of the climate control system 700.

In FIG. 7B, the climate control system 700 is shown operating in a heat pump mode or a cold pump mode, for example, in a cold environment or a hot environment, respectively. To operate the climate control system 700 in the heat pump mode, the heat exchangers 710, 712 selectively operate or function as gas coolers, condensers, or combinations thereof to warm the airflow that enters the front module 704, as indicated using the arrow 732, and the rear module 706, as indicated using the arrow 734. The heat exchanger 714 in the rear module 708 selectively operates or functions as an evaporator to cool or receive heat from the airflow that exits the vehicle cabin 702 through the extraction or exhaust path 724 indicated using the arrow 736. The mode door or partition 726 is controlled to open the extraction or exhaust path 722 and promote airflow out of the vehicle cabin 702 as indicated using an arrow 740 to reduce an overall change in pressure to the vehicle cabin 702 during venting.

To operate the climate control system 700 in the cold pump mode, the heat exchangers 710, 712 selectively operate or function as evaporators to cool the airflow that enters the front module 704, as indicated using the arrow 732, and the rear module 706, as indicated using the arrow 734. The heat exchanger 714 in the rear module 708 selectively operates or functions as a gas cooler, a condenser, or combinations thereof to warm the airflow that exits the vehicle cabin 702 through the extraction or exhaust path 724 indicated using the arrow 736. The mode door or partition 726 is controlled to open the extraction or exhaust path 722 and promote airflow out of the vehicle cabin 702 as indicated using the arrow 740. The extraction or exhaust path 722 is selectively opened by the mode door or partition 726 to encourage a more uniform pattern of airflow and pressure change during venting of the vehicle cabin 702. In other words, since both of the extraction or exhaust paths 722, 724 are available for venting, airflow through the vehicle cabin 702 may be relatively uniform to support user comfort.

In FIG. 7B, and in both the heat pump and cold pump examples, the position of the mode door or partition 726 differs from the position shown in FIG. 7A for the heating with recapture and cooling with recapture modes, that is, the mode door or partition 726 moves from blocking the extraction or exhaust path 722 in FIG. 7A to opening the extraction or exhaust path 722 in FIG. 7B. The heat or cold collected or reclaimed by the heat exchanger 714 in the rear module 708 in the heat pump and cold pump operational modes can be put to other uses in the vehicle, including for continued use in optimizing performance of the climate control system 700. Other benefits of the heat pump and cold pump operational modes are similar to those described with respect to the climate control systems 200, 300, 400, 500, 600 in FIGS. 2A to 6.

Figure 8:
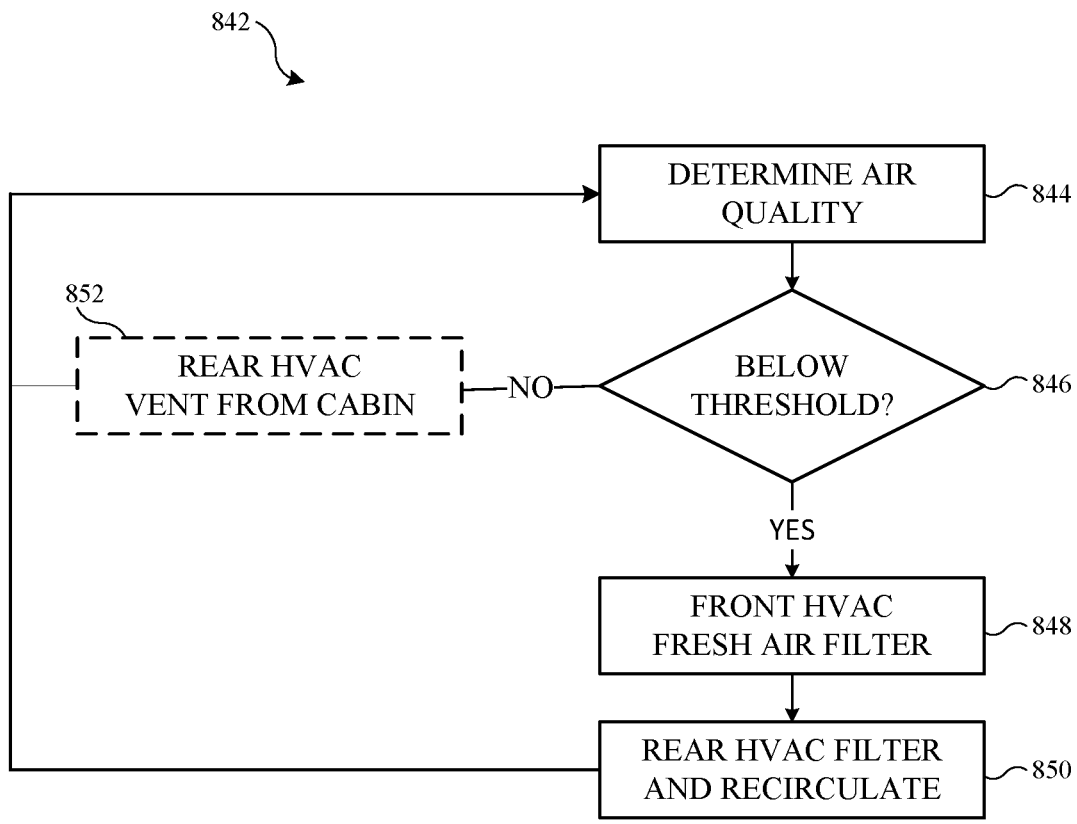
FIG. 8 is a process diagram for a climate control method for use with a vehicle cabin.

FIG. 8 is a process diagram for a climate control method 842 for use with a vehicle cabin such as the vehicle cabins 102, 202, 302, 402, 502, 602, 702 of FIGS. 1 to 7B. The method 842 includes a step 844 of determining an air quality parameter, for example, based on analysis of sensor information received from a sensor located within an interior of a vehicle cabin, such as from one or more of the sensors 130 in FIG. 1. The sensor information captured or received by the sensors can relate to particulate presence and type, particulate concentration, temperature, humidity, flowrate, or any other ambient conditions within a vehicle cabin that allow a determination of the air quality parameter.

In decision tree 846, the method 842 includes determining whether the air quality parameter is below an air quality threshold. In one example, the air quality threshold may be associated with a green rating or a yellow rating based on the United States Air Quality Index (AQI). In another example, the air quality threshold may be associated with particulate or concentration levels of specified values. That is, the air quality threshold may identify threshold particulate levels for carbon monoxide, lead, nitrogen oxides, ground-level ozone, sulfur oxides, or other particulate matter.

If the air quality parameter is below the air quality threshold, the method 842 proceeds to step 848, and a command is sent to a climate control system, such as one of the climate control systems 100, 200, 300, 400, 500, 600, 700. The command is configured to cause a first portion of the climate control system, such as one of the front modules 104, 204, 304, 404, 504, 604, 704, to draw fresh air from an exterior of a vehicle cabin through a first filter and into the vehicle cabin. The first filter, such as one of the filters 116, 216, 316, 416, 516, 616, 716, can be configured to meet a high efficiency particulate air (HEPA) filtration rating. The first portion of the climate control system can be configured to draw air from the exterior of the vehicle cabin through at least one of a first pump and a first heat exchanger in addition to the first filter.

The method 842 then proceeds to step 850, and a second portion of the climate control system, such as one of the rear modules 106, 206, 306, 406, 506, 606, 706, is sent a command to draw air from the vehicle cabin through a second filter, such as one of the filters 118, 218, 318, 418, 518, 618, 718, before returning the air to the vehicle cabin (e.g., through one of the respective recirculation paths 120, 220, 320, 420, 520, 620, 720). The second filter can be configured to remove at least 95% of airborne particles per a United States National Institute for Occupational Safety and Health (NIOSH) filtration rating. The second portion of the climate control system can be configured to draw air from the vehicle cabin through at least one of a second pump and a second heat exchanger in addition to the second filter. The method 842 can then return to step 844, and the air quality parameter can be measured again immediately or at a predetermined time interval.

If the decision tree 846 indicates that the air quality parameter is not below the predetermined air quality threshold, the method 842 continues to optional step 852, where a command can be sent to the climate control system that is configured to cause the second portion of the climate control system to vent the air from the vehicle cabin to the exterior of the vehicle cabin, for example, in heat pump mode, a heating with recapture mode, a cold pump mode, or a cooling with recapture mode of operation. In other words, the second portion of the climate control system will not need to execute a second filtration and recirculation; instead, air from the cabin can be vented with (or without) heat pump or cold pump features of heat or cold recapture being executed during venting. The method 842 can then return to the step 844, and the air quality parameter can be measured at the appropriate interval, restarting the method 842. Though the method 842 is described as either a continual or interval-based loop, the method 842 may be executed in response to other indicators, such as based on sensor information from sensors capturing information from an environment external to a vehicle. If on an interval-based loop, the method 842 may be executed on a timed basis, e.g., every 1, 5, or 10 minutes.

Figure 9:
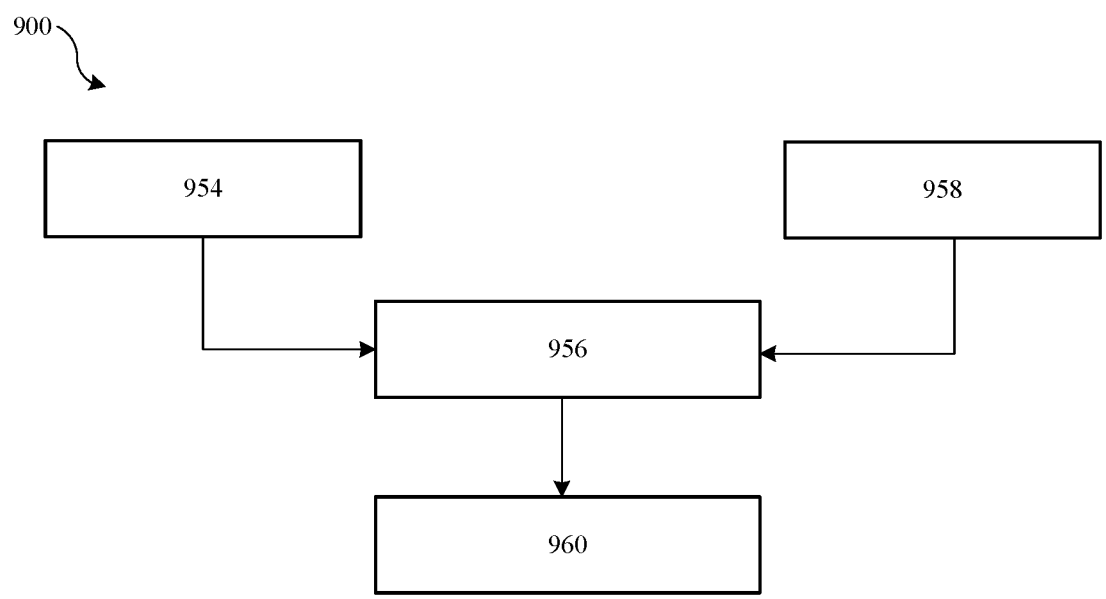
FIG. 9 is a block diagram of a climate control system.

FIG. 9 is a block diagram that shows a climate control system 900. The climate control system 900 can include a user interface 954, a controller 956, sensors 958, and a heating, ventilation, and air conditioning (HVAC) module 960. The climate control system 900 can operate in a manner similar to the climate control systems 100, 200, 300, 400, 500, 600, 700 described in reference to FIGS. 1-7B. The HVAC module 960 can include one or more housings, heat exchangers, flow paths, and/or doors that direct and condition intake airflow for the climate control system 900 and can operate in a manner similar to the front modules 104, 204, 204, 404, 504, 604, 704 and rear modules 106, 108, 206, 208, 306, 308, 406, 506, 508, 606, 608, 706, 708.

The user interface 954 allows a user to modify aspects of the operation of the climate control system 900 and to set operational modes for the HVAC module 960. For example, various operational modes can result in heating, cooling, recirculating, dehumidifying, or otherwise conditioning or reclaiming heat from airflow into and out of a vehicle cabin using the HVAC module 960. That is, the user interface 954 can allow modification of operating parameters of the HVAC module 960, for example, based on user preferences or air quality parameters.

The controller 956 coordinates operation of the climate control system 900 by communicating electronically (e.g., using wired or wireless communications) with the user interface 954, the sensors 958, and the HVAC module 960. The controller 956 may receive information (e.g., signals and/or data) from the user interface 954, from the sensors 958, and/or from other portions (not shown) of the climate control system 900.

The sensors 958 may capture or receive information related, for example, to an environment where the climate control system 900 is located. The environment can be an exterior or an interior of a vehicle cabin, and information captured or received by the sensors 958 can relate to particulate levels, temperature, humidity, airflow rate, or other ambient conditions within or outside of the vehicle cabin.

The climate control system 900 can automatically change an operational mode of the HVAC module 960 based on a control signal, such as a signal from the controller 956. The control signal may cause the HVAC module 960 to vary mode door or partition positions, airflow paths, airflow volumes, blower speeds, air temperatures, humidity levels, heat exchanger operation, etc. For example, a control signal can cause the HVAC module 960 to change from a first operational mode where airflow follows a flow path passing through an evaporator prior to entering a vehicle cabin and a second operational mode where airflow follows a flow path passing through a gas cooler prior to entering the vehicle cabin. Various technologies that may be used to implement the climate control system 900 include thermal loops, heat exchangers such as condensers, resistance heaters, gas coolers, or evaporators, blowers or fans, compression devices, expansion devices such as nozzles or valves, ducts, vents, mode doors, partitions, etc.

Figure 10:
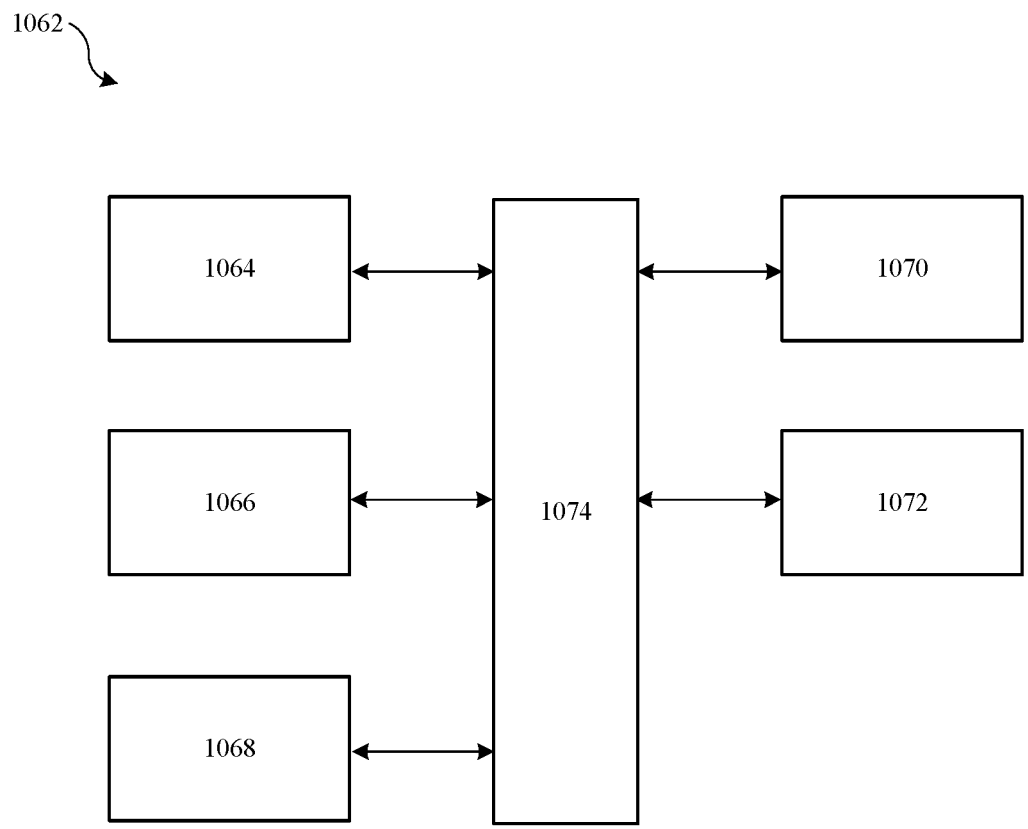
FIG. 10 is an illustration showing a hardware configuration for a controller.

FIG. 10 shows an example of a hardware configuration for a controller 1062 that may be used to implement the controller 956 and/or other portions of the climate control system 900. In the illustrated example, the controller 1062 includes a processor 1064, a memory device 1066, a storage device 1068, one or more input devices 1070, and one or more output devices 1072. These components may be interconnected by hardware such as a bus 1074 that allows communication between the components.

The processor 1064 may be a conventional device such as a central processing unit and is operable to execute computer program instructions and perform operations described by the computer program instructions. The memory device 1066 may be a volatile, high-speed, short-term information storage device such as a random-access memory module. The storage device 1068 may be a non-volatile information storage device such as a hard drive or a solid-state drive. The input devices 1070 may include sensors and/or any type of human-machine interface, such as buttons, switches, a keyboard, a mouse, a touchscreen input device, a gestural input device, or an audio input device. The output devices 1072 may include any type of device operable to provide an indication to a user regarding an operating mode or state, such as a display screen, an interface for a climate control system such as the climate control systems 100, 200, 300, 400, 500, 600, 700, or an audio output.

As described above, one aspect of the present technology is the gathering and use of data available from various sources, such as from sensors 130, 958 or user profiles, to improve the function of climate control systems such as the climate control systems 100, 200, 300, 400, 500, 600, 700. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of personal information data, in the present technology, can be used to the benefit of users. For example, the personal information data can be used to deliver changes to operational modes of climate control systems to best match user preferences. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based cabin temperature regulation through a climate control system, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, changes in operational modes in climate control systems can be implemented for a given user by inferring user preferences based on non-personal information data, a bare minimum amount of personal information, other non-personal information available to the system, or publicly available information.

What is claimed is:

1. A climate control system for a vehicle cabin, comprising:
   a first heat exchanger configured to thermally condition airflow from an interior of the vehicle cabin;
   a recirculation path configured to return airflow from the first heat exchanger to the vehicle cabin;
   a first extraction path configured to vent airflow from the first heat exchanger to an environment external to the vehicle cabin;
   a second heat exchanger configured to thermally condition airflow from the interior of the vehicle cabin; and
   a second extraction path, the second extraction path configured to vent airflow from the second heat exchanger to the environment external to the vehicle cabin,
   wherein the second heat exchanger is configured to operate in a heat pump operational mode and a cold pump operational mode.

2. The climate control system of claim 1, further comprising:
   a partition configured to block either the recirculation path or the first extraction path based on an operational mode of the climate control system.

3. The climate control system of claim 1, wherein the partition is a first partition, further comprising:
   a second partition configured to selectively block the second extraction path.

4. The climate control system of claim 1, wherein the first and second heat exchangers selectively operate as one of evaporators, gas coolers, or condensers.

5. The climate control system of claim 1, wherein the first heat exchanger is configured to heat airflow and the second heat exchanger is configured to cool airflow in the heat pump operational mode, and wherein the first heat exchanger is configured to cool airflow and the second heat exchanger is configured to heat airflow in the cold pump operational mode.

6. The climate control system of claim 5, wherein the first heat exchanger is disposed at a first side of the vehicle cabin, and wherein the second heat exchanger is disposed at a second side of the vehicle cabin.

7. The climate control system of claim 5, wherein the partition blocks airflow from the first heat exchanger from the recirculation path so that airflow from the first heat exchanger follows the first extraction path in the heat pump operational mode and the cold pump operational mode.

8. The climate control system of claim 1, further comprising:
a bypass path configured to selectively route airflow around the first heat exchanger.

9. The climate control system of claim 1, wherein the first heat exchanger is configured to operate in a heating operational mode and a cooling operational mode, and wherein the second heat exchanger is configured to operate in the heating operational mode, the cooling operational mode, the heat-pump operational mode, and the cold-pump operational mode.

10. The climate control system of claim 1, wherein the second extraction path is separate and spaced from the first extraction path.

11. A climate control module, comprising:
a heat exchanger configured to thermally condition airflow received from a vehicle cabin, wherein the heat exchanger is configured to heat airflow in a heating mode of operation, a heating with recapture mode of operation, and a cold pump mode of operation;
a recirculation path configured to direct airflow received from the heat exchanger back to the vehicle cabin;
an exhaust path configured to direct airflow received from the heat exchanger to an exterior of the vehicle cabin; and
a mode door controllable to selectively close the recirculation path or the exhaust path based on the mode of operation of the climate control module.

12. The climate control module of claim 11, wherein the heat exchanger is configured to cool airflow in a cooling mode of operation, a cooling with recapture mode of operation, and a heat pump mode of operation.

13. The climate control module of claim 12, wherein the heat exchanger is a first heat exchanger, and wherein the extraction path is a first extraction path, the climate control module further comprising:
a second heat exchanger configured to thermally condition airflow from the interior of the vehicle cabin; and
a second extraction path, the second extraction path configured to vent airflow from the second heat exchanger to the environment external to the vehicle cabin.

14. The climate control module of claim 13, wherein the second extraction path is separate and spaced from the first extraction path.

15. The climate control module of claim 13, wherein the first heat exchanger is disposed at a first side of the vehicle cabin, and wherein the second heat exchanger is disposed at a second side of the vehicle cabin.

16. The climate control module of claim 13, wherein the first heat exchanger is configured to heat airflow and the second heat exchanger is configured to cool airflow in the heat pump mode of operation, and wherein the first heat exchanger is configured to cool airflow and the second heat exchanger is configured to heat airflow in the cold pump mode of operation.

17. The climate control module of claim 11, wherein the heat exchanger selectively operates as one of an evaporator, a gas cooler, or a condenser.

18. The climate control module of claim 11, wherein the mode door includes a seal or dampening material to selectively cover the recirculation path or the exhaust path, and wherein the recirculation path includes a duct configured to direct airflow from a location downstream of the heat exchanger to a central location within the vehicle cabin.

19. A climate control system, comprising:
a first heat exchanger configured to thermally condition airflow received from a vehicle cabin;
a second heat exchanger spaced from the first heat exchanger and configured to thermally condition airflow received from a vehicle cabin;
a first exhaust path configured to direct airflow received from the first heat exchanger to an exterior of the vehicle cabin;
a second exhaust path spaced from the first exhaust path and configured to direct airflow received from the second heat exchanger to an exterior of the vehicle cabin,
wherein the first heat exchanger and the second heat exchanger are configured to heat airflow in a cold pump mode of operation, and
wherein the first heat exchanger and the second heat exchanger are configured to cool airflow in a heat pump mode of operation.

20. The climate control system of claim 19, further comprising:
a first partition configured to block the first exhaust path based on a mode of operation of the climate control system; and
a second partition configured to block the second exhaust path based on the mode of operation of the climate control system.

* * * * *